United States Patent [19]

Williams

[11] 4,257,534

[45] Mar. 24, 1981

[54] APPARATUS AND METHOD FOR DISPENSING SEEDS FROM SEED PACKAGES

[76] Inventor: Gayland M. Williams, 11 Maple St., North Springfield, Vt. 05150

[21] Appl. No.: 25,159

[22] Filed: Mar. 29, 1979

[51] Int. Cl.³ .............................................. A01C 7/02
[52] U.S. Cl. ........................................ 222/1; 222/502; 222/537; 239/225; 239/374
[58] Field of Search .................... 222/1, 83, 83.5, 320, 222/328, 353, 367, 370, 456, 457.5, 464, 502, 519, 531, 532, 537, 538, 541; 221/265, 263, 302; 239/225, 374, 652

[56] References Cited

U.S. PATENT DOCUMENTS

| 976,066 | 11/1910 | Gillette | 222/456 |
| 2,341,031 | 2/1944 | Flynn | 222/502 X |
| 3,333,745 | 8/1967 | Hartley et al. | 222/353 X |
| 3,980,210 | 9/1976 | Kligerman | 222/456 |

*Primary Examiner*—F. J. Bartuska
*Attorney, Agent, or Firm*—Sughrue, Rothwell, Mion, Zinn and Macpeak

[57] ABSTRACT

Seeds within a package are dispensed through a seed tube dispenser in the form of a tubular member having a long straight portion for insertion into the seed package and an angled end portion with a dispensing opening. When the package is tilted and the dispensing opening adjusted seeds are dispensed at the rate required by rotating the seed tube within the package which is folded and clamped to prevent spillage of seeds and to act as a journal for rotating the tube.

4 Claims, 7 Drawing Figures

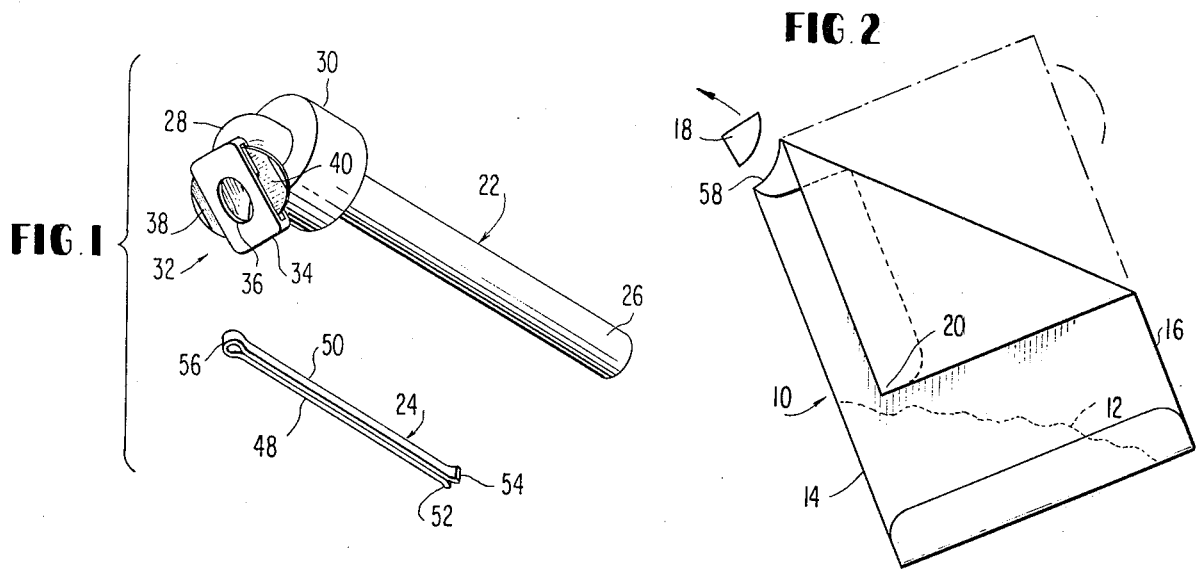
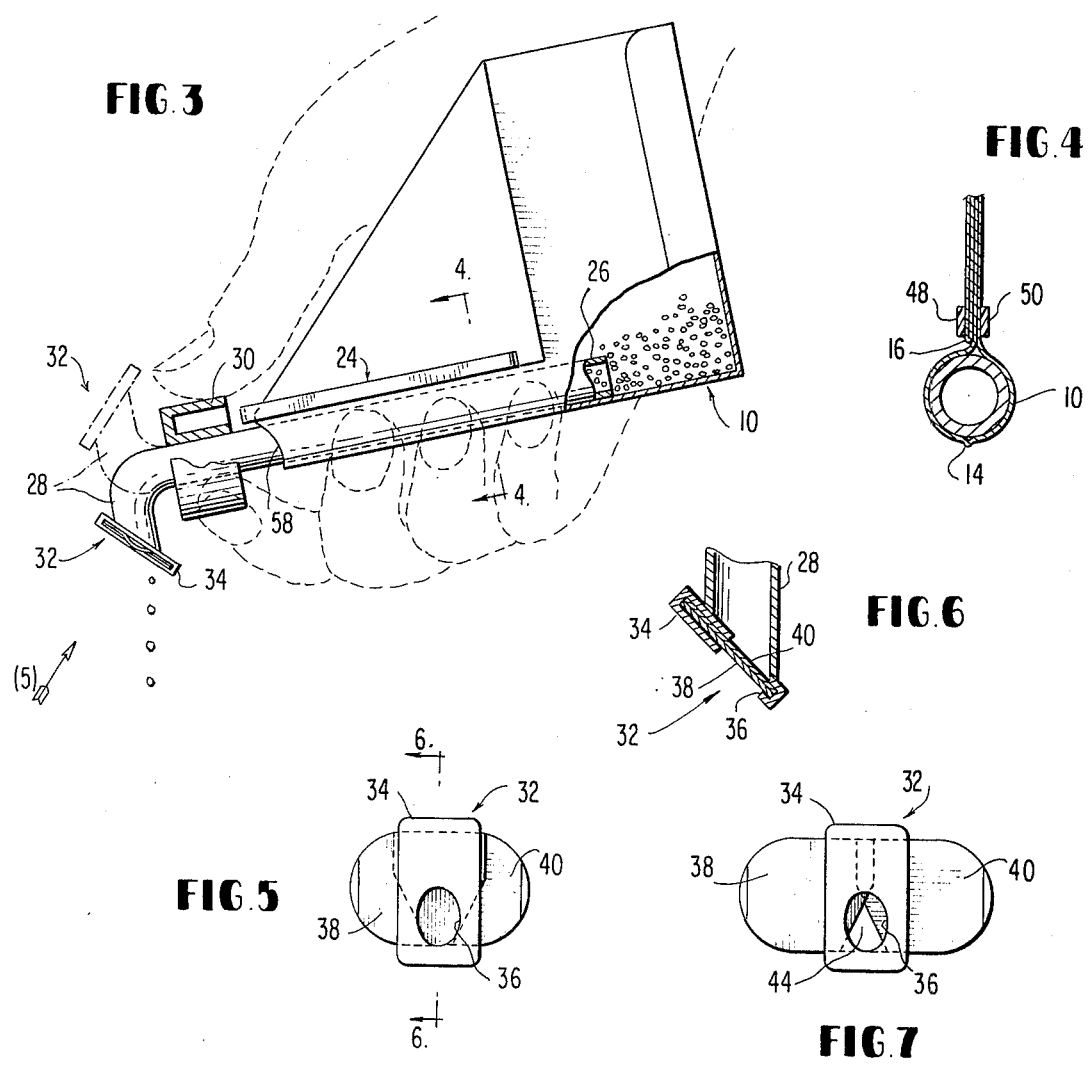

APPARATUS AND METHOD FOR DISPENSING SEEDS FROM SEED PACKAGES

BACKGROUND OF THE INVENTION

1. Field of the Invention

This invention relates to a seed tube dispenser for dispensing seeds from generally flat rectangular packages containing small agricultural seeds and a method for dispensing such seeds from such packages.

2. Prior Art

It is common to sell small agricultural seeds in generally flat rectangular packages, particular for home gardeners and the like. The seeds within the packages are small and relatively difficult to dispense from the package by hand. In dispensing seeds for sowing or planting, it is desirable to dispense them at a rate depending upon the crop being sown and other agricultural factors. Seed dispensers for planting seeds in commercial quantities are known, e.g., agricultural planters used by farmers. However, there is no known effective, efficient, simple and inexpensive seed dispenser for the common packages of seeds usually available to home gardeners.

There appears to be a need in the art for a simple economical dispenser and a method for using it to dispense seeds from such common packages in a more precise and easy manner than can be done manually.

SUMMARY OF THE INVENTION

This invention provides a seed tube for dispensing seeds from packages of the type available to home gardeners. The dispenser is in the form of a tube having a bent or angled end with an adjustable dispensing opening thereat. The tube is inserted into one side of the package after removing a corner and the package is folded and clipped closed by a clip so that it functions as a journal. The tube is then rotated by a gripping area between the dispensing end and the portion of the tube within the package to dispense the seeds at a desired rate depending upon the rotation of the tube.

BRIEF DESCRIPTION OF THE DRAWINGS

FIG. 1 is a perspective view of the seed tube and clip which could conveniently sold together as a kit.

FIG. 2 is a plan view of a conventional package for small seeds showing the original configuration of the package prior to folding in phantom lines, the removal of a portion of the package for use in the dispenser, and showing the level of seeds in the package by dotted lines.

FIG. 3 illustrates the seed dispenser of this invention in use in a elevation view with portions broken away for clarity and showing the user's hand in dotted lines.

FIG. 4 is a sectional view taken along line 4—4 of FIG. 3.

FIG. 5 is an elevation view of the seed dispensing opening looking in the direction of the arrow 5 in FIG. 3.

FIG. 6 is an elevation view taken along line 6—6 of FIG. 5.

FIG. 7 is a view similar to FIG. 5 showing adjustment of the seed dispensing opening.

DESCRIPTION OF THE PREFERRED EMBODIMENT

A generally flat rectangular package 10 for small agricultural seeds is shown in FIG. 2. This is the type of package which most agricultural seeds are dispensed in for home gardening, greenhouses, and the like. Small seeds 12 are held in the sealed package but usually only fill a small portion of the package. As shown in FIG. 2, the package includes long side edges 14 and 16, corners 18 and 20.

FIG. 1 shows the seed dispensing units which could be in the form of a kit. There is a seed tube assembly 22 and a clip 24.

The seed tube assembly includes a hollow tube having a straight portion 26 and an angled or bent portion 28 at the dispensing end. The straight portion just adjacent the angled portion has a collar 30 to function as a gripping means to grip and turn the seed tube when in use. At the end of the bent or angled portion there is a variable opening means 32 which includes a housing 34 secured to the end of the bent portion having an outlet opening 36 therein. A pair of sliding discs 38 and 40 are slidably mounted to be moved toward and away from each other by the fingers of the user, see also FIGS. 5 and 7. The portions of the disc which extend outwardly of the housing 34, see FIG. 1, can be gripped by the fingers to slide the discs and accordingly adjust the size of a dispensing opening 44.

The clip 24 is formed of any suitable resilient string material and has legs 48 and 50 with outwardly diverging ends 52 and 54. The legs 48 and 50 are integrally connected by head portion 56 so that the clip may be inserted onto the tube package as shown in FIGS. 3 and 4.

The entire seed tube assembly and the clip may be made of plastic, and the collar 30 may be an integral part of the tube 26.

In operation and in describing the method of this invention, reference is had particularly to FIGS. 2 and 3. The conventional package 10 having a predetermined amount of small seeds 12 therein is prepared for use by removing corner 18 by tearing or cutting it off from the rest of the package. This creates a opening 58 in the corner of the package. With the package held upright so that the seeds 12 do not fall out of the opening 58, i.e., in the position of FIG. 2, the seed tube assembly 22 is inserted with the straight portion 26 of the tube extending along the inside of the long side 14. The corner 20 of the seed package is turned down as shown in FIG. 2 so that it occupies the position shown also in FIGS. 3 and 4. The clip 24 is then installed in the position of FIGS. 3 and 4. At that time the dispenser is ready for use.

The slidable discs 38 and 40 are adjusted to adjust the size of the dispensing opening 44 depending on the size of the seeds 12 in the package. The collar or hub 30 is grasped by the fingers as shown in FIG. 3 and the package is tilted to the position shown in FIG. 3 in order to start dispensing the seeds. As the tube is rotated, seeds will fall from opening 44 when the bent portion 28 of the seed tube extends downwardly as in the full-line position of FIG. 3 and seeds will not be dispensed when it is turned upwardly in the phantom line position of FIG. 3. Thus, the speed of rotation and the area of opening 44 determine the number of seeds dispensed as the seed package is moved along the area where the seeds are to be sown or planted. The clip 24 prevents seeds from coming out the opening 58 around the seed tube and also holds the package as shown in FIG. 4 to function as a journal for the rotation of the seed tube therein.

The seed dispenser and the method of this invention are simple economical and provide a very efficient and easy means of dispensing otherwise difficult to handle very small agricultural seeds.

Although a preferred embodiment of the invention has been described, it is believe that numerous modifications and alterations would be apparent to one having ordinary skill in the art without departing from the spirit and scope of the invention as defined in the appended claims.

What is claimed is:

1. A seed dispenser for use with a generally flat rectangular package containing small agricultural seeds therein, the dispenser comprising:
   (a) a hollow seed tube having a straight portion and an end portion extending at an angle to the straight portion,
   (b) gripping means on the straight portion of the seed tube adjacent the angled end portion for gripping the tube by the fingers and rotating the same,
   (c) means for variably controlling the size of an opening from the angled portion of the seed tube, the seed tube being insertable into the seed package along an edge thereof so that by tilting the seed package, rotating the tube and controlling the opening, agricultural seeds may be dispensed from the tube, and
   (d) a clip for insertion onto the seed package adjacent to the tube when the tube is inserted into the package so that the package functions as a bearing for the rotatable tube and to further seal the package around the tube.

2. A seed dispenser as in claim 1 wherein the gripping means is a collar rigid with the seed tube.

3. A seed dispenser as in claim 2 wherein the means for variably controlling the size of the opening includes a housing, a pair of discs slidably mounted on the housing, the housing having an opening therein overlying the opening of the bent end of the tube, and the slidably movable discs restricting the opening so as to provide a variable size dispensing opening.

4. A method of dispensing small agricultural seeds from generally flat rectangular seed packages comprising:
   (a) removing one corner of a seed package, creating an opening large enough to insert a tube while positioning the package so that seed therein will not flow out through the opening;
   (b) inserting a straight portion of a seed tube having a straight portion and a bent end portion into the package through the opening and along one side of the package;
   (c) folding down a corner of the seed package so that a part of the side of the seed package opposite the side with the tube is positioned adjacent the tube;
   (d) applying a clip to hold the folded down corner of the package in place and cause the package portion around the tube to journal the tube and the opening to be sealed around the tube;
   (e) adjusting the size of an adjustable opening on the bent end of the tube;
   (f) tilting the package so that seeds within the package position themselves in conjunction with tube rotation to flow into the straight portion of the tube and down the tube toward the bent portion of the tube, and
   (g) rotating the tube to dispense seeds therefrom a few at a time.

* * * * *